US012518232B2

(12) United States Patent
Gao et al.

(10) Patent No.: US 12,518,232 B2
(45) Date of Patent: Jan. 6, 2026

(54) SECOND TYPE COMPUTER ASSEMBLY LINE BALANCING OPTIMIZATION METHOD BASED ON MIGRATION GENETIC ALGORITHM

(71) Applicant: Northeastern University, Shenyang (CN)

(72) Inventors: Hongrui Gao, Shenyang (CN); Feng Xue, Shenyang (CN); Yingwei Zhang, Shenyang (CN); Lin Feng, Shenyang (CN); Shengyang Zhang, Shenyang (CN); Zubian Li, Shenyang (CN)

(73) Assignee: NORTHEASTERN UNIVERSITY, Shenyang (CN)

( * ) Notice: Subject to any disclaimer, the term of this patent is extended or adjusted under 35 U.S.C. 154(b) by 780 days.

(21) Appl. No.: 17/912,807

(22) PCT Filed: Dec. 3, 2021

(86) PCT No.: PCT/CN2021/135433
§ 371 (c)(1),
(2) Date: Sep. 19, 2022

(87) PCT Pub. No.: WO2023/087418
PCT Pub. Date: May 25, 2023

(65) Prior Publication Data
US 2024/0029000 A1 Jan. 25, 2024

(30) Foreign Application Priority Data
Nov. 18, 2021 (CN) .......................... 202111367235.0

(51) Int. Cl.
*G06N 3/126* (2023.01)
*G06N 3/02* (2006.01)
(Continued)

(52) U.S. Cl.
CPC ....... *G06Q 10/06375* (2013.01); *G06N 3/126* (2013.01)

(58) Field of Classification Search
CPC .............................. G06N 5/027; G06N 5/045
See application file for complete search history.

(56) References Cited

U.S. PATENT DOCUMENTS

2005/0177351 A1* 8/2005 Goldberg ................ G06F 18/23
703/1
2010/0152813 A1* 6/2010 Lineaweaver ..... A61N 1/36039
607/57

(Continued)

FOREIGN PATENT DOCUMENTS

| CN | 109146136 A | 1/2019 |
| CN | 110889534 A | 3/2020 |
| CN | 112632777 A | 4/2021 |

*Primary Examiner* — Brandon S Cole
(74) *Attorney, Agent, or Firm* — MUNCY, GEISSLER, OLDS & LOWE, P.C.

(57) ABSTRACT

A second type computer assembly line balancing optimization method based on a migration genetic algorithm, and related to the technical field of assembly line balancing. The method uses assembly experience of similar assembly lines, the feasible solution set of the known assembly lines is transferred to the initial solution set of the assembly line balancing problem to be optimized, due to the migration of high-quality feasible solutions. The method can effectively reduce the sensitivity of the algorithm performance to the initial value and parameters, and improve the lower limit of the local optimal feasible solution of the heuristic algorithm to solve the assembly line balancing problem.

10 Claims, 6 Drawing Sheets

(51) Int. Cl.
 *G06N 3/044* (2023.01)
 *G06Q 10/0637* (2023.01)

(56) References Cited

U.S. PATENT DOCUMENTS

| | | | |
|---|---|---|---|
| 2012/0140636 A1* | 6/2012 | Resende | H04L 45/08 |
| | | | 370/238 |
| 2014/0344196 A1 | 11/2014 | Cantin | |
| 2018/0314938 A1* | 11/2018 | Andoni | G06N 3/0985 |
| 2020/0210922 A1* | 7/2020 | Devarakonda | G05B 13/028 |

* cited by examiner

SECOND TYPE COMPUTER ASSEMBLY LINE BALANCING OPTIMIZATION METHOD BASED ON MIGRATION GENETIC ALGORITHM

BACKGROUND OF THE INVENTION

1. Field of the Invention

The present invention relates to the field of assembly line balancing techniques, and particularly relates to a second type computer assembly line balancing optimization method based on a migration genetic algorithm.

2. The Prior Arts

With the rapid economic development, an assembly technology in the discrete manufacturing industry of China has been greatly developed. An assembly line balancing problem is a problem that production enterprises have always paid attention to, and is also a good means of optimizing allocation of enterprise resources. The assembly line balancing problem varies in different periods with changes in a manufacturing technology, a manufacturing mode and a manufacturing process. At present, the assembly production line has developed from traditional manual assembly to automated, modular station assembly, and finally formed a mobile assembly production line in which assembly stations move at a certain rhythm and operate in a standardized manner.

In recent years, "flexible production" and "flexible manufacturing" are always under the spotlight. Computer manufacturing enterprises often need to meet requirements for a large number of diversified orders, and the production process involved in a large number of personalized orders is very complex and changeable. For this reason, in the computer assembly process, it is necessary to switch production lines frequently to adapt to a variety of different technological processes. Besides, it is necessary to deal with impact on production capacity and quality caused by highly uncertain production process changes caused by changes in demand. The assembly line balancing problem is closely related to the utilization rate, production efficiency and assembly quality of the assembly line, so that optimizing the assembly line balancing problem of computers is of great significance for reducing the production cost of the computers, improving the assembly quality of the computers, and shortening the production cycle of the computers.

Nowadays, methods for solving the assembly line balancing problem are divided into five categories: (1) a mathematical programming method, wherein an accurate algorithm is used to solve a production line balancing optimization problem, such method mainly uses classical optimization theories and methods to calculate all possible solutions, such as linear programming, nonlinear programming, integer programming, dynamic programming, and multi-objective optimization. (2) A heuristic method, such as a genetic algorithm, a particle swarm optimization, an ant colony algorithm and an artificial bee colony algorithm, wherein the method is simple, easy to understand and efficient, has been recognized by most managers and technicians, and is widely promoted and applied to the field of assembly line balancing. (3) An intelligent optimization method, wherein there are many commonly used intelligent optimization algorithms, such as a simulated annealing algorithm, a taboo search algorithm, a bacterial foraging optimization algorithm, an immune algorithm and a DNA algorithm. (4) An industrial engineering method, such as a 5W1H method, an ECRS analysis method, a work measurement method, a program analysis method, an operator balance chart, PDCA, and on-site 5S. Such method is a comprehensive technology to optimize the configuration of production system elements such as people, equipment, materials, information and environment, and to systematically plan and design, evaluate and innovate industrial and other production processes, thereby improving specialized industrial productivity and social and economic benefits. (5) A simulation-based method, wherein the production line assembly process is simulated by a computer, so as to adjust the process sequence to effectively optimize the content of each operation process, reduce and merge redundant processes, and improve the beat and efficiency of the production line. The methods respectively have advantages and disadvantages, for example, the mathematical programming method can obtain an optimal analytical solution, but the computational amount is too large; the heuristic method can quickly obtain answers, but the obtained solution is often sub-optimal; the intelligent optimization method is widely used, and can efficiently solve NP-complete problems, but parameters of the intelligent optimization method are difficult to control, convergence speed is slow, execution time is long, it has defects such as being partially optimal, the algorithm performance is related to the initial value, and the parameters are sensitive. The industrial engineering method facilitates implementation of improvement measures, but is limited by the experience and management level of field managers; and the simulation-based method usually cannot fully simulate the production elements of a manufacturing assembly process. Therefore, the assembly line balancing problem must be analyzed and solved according to actual situations.

SUMMARY OF THE INVENTION

Aiming at defects existing in the prior art, the present invention proposes a second type computer assembly line balancing optimization method based on a migration genetic algorithm to find an optimal assembly solution quickly after frequently switching production lines to adjust a production process in an assembly process of computers, and to increase the utilization rate of an assembly line, thereby improving the production efficiency of enterprises and product quality.

The second type computer assembly line balancing optimization method based on a migration genetic algorithm is characterized by comprising the following steps:

Step 1: acquiring data of a production line assembly process of a type-A computer and a type-B computer, and expressing data of operation sequence, standard operation time and operation interval in a matrix form.

Step 2: according to a matrix branch expressing the operation sequence of the assembly process of the type-A computer, constructing a priority relationship matrix Matrix of the assembly process of the type-A computer.

Step 3: according to the priority relationship matrix Matrix of the assembly process of the type-A computer and the operation interval expressed in the matrix form, initializing the population of the genetic algorithm, initializing relevant parameters of the genetic algorithm, wherein each chromosome in an initial population obtained by initialization corresponds to one feasible solution to the assembly line balancing problem of the type-A computer, and the relevant parameters of the genetic algorithm comprise number of initial populations, population size, the number of exchange genes, crossover probability of the populations, and mutation probability of the populations.

Step 4: reproducing the initial populations, and searching and storing high-quality feasible solutions in the populations in the process of population reproduction, wherein all high-quality feasible solutions form an external solution set of the assembly line balancing problem of the type-A computer.

Step 5: splitting or merging assembly operation units of the type-B computer, making corresponding processing to assembly operation units of the type-A computer, to obtain new operation sequence and operation interval of the assembly process of the type-B computer, and after such processing, adjusting the external solution set of the assembly line balancing problem of the type-A computer, so that the adjusted external solution set meets the technological requirements of the assembly line of the type-B computer, including the operation sequence and the operation interval of the assembly line of the type-B computer.

Step 6: calculating a similarity of the assembly process of the type-A computer and the type-B computer by comprehensively considering three factors of the standard operation time, the operation sequence and the operation interval.

Step 7: calculating a value of a fitness function of each chromosome in the external solution set obtained in the Step 5, selecting W chromosomes with the largest values of the fitness function from the external solution set, and forming a high-quality feasible solution set to the assembly line balancing problem of the type-B computer, wherein W is determined according to the similarity of the assembly process of the type-A computer and the type-B computer calculated in the step 6.

Step 8: initializing U chromosomes according to the new operation sequence and the operation interval of the assembly process of the type-B computer, and combining the high-quality feasible solution set of the assembly line balancing problem of the type-B computer with the U chromosomes to form the initial population of the assembly line balancing problem of the type-B computer, wherein each chromosome in the initial population corresponds to one feasible solution of the assembly line balancing problem of the type-B computer.

Step 9: performing a preset number of reproduction operations on the initial population of the assembly line balancing problem of the type-B computer, and selecting preset Q feasible solutions with the largest values of the fitness function in each population reproduction process to optimize the feasible solution of the assembly line balancing problem of the type-B computer by replacing Q feasible solutions with the smallest values of the fitness function in the next reproduction population so as to obtain the optimal solution set of the assembly line balancing problem of the type-B computer.

Further, according to the second type computer assembly line balancing optimization method based on a migration genetic algorithm, the data of the production line assembly process in the Step 1 comprises the number of assembly line workstations, the operation sequence, the serial number of the operation units, the standard operation time, and the operation interval.

Further, according to the second type computer assembly line balancing optimization method based on a migration genetic algorithm, in the Step 1, when the operation sequence is expressed in the matrix form, each operation unit and immediate predecessor operation thereof are arranged in pairs in the matrix to obtain a matrix branch.

Further, according to the second type computer assembly line balancing optimization method based on a migration genetic algorithm, a method for establishing a priority relationship matrix Matrix of the assembly process of the type-A computer is as follows: if the operation unit i is the immediate predecessor operation of the operation unit j in the matrix branch, setting the $i_{th}$ row and the $j_{th}$ column in the matrix Matrix as 1, or else, setting the values as 0.

Further, according to the second type computer assembly line balancing optimization method based on a migration genetic algorithm, a method for initializing the population of the genetic algorithm according to the priority relationship matrix Matrix of the assembly process and the operation interval expressed in the matrix form, of the type-A computer defined in the Step 3, comprises the following steps:

Step 3-2: initializing the population of the genetic algorithm by using the operation sequence and the operation interval as constraints to ensure that each chromosome corresponds to one feasible solution of the assembly line balancing problem of the type-A computer.

Step 3-2-1: taking the total number of the operation units in the assembly process of the type-A computer as a length N of the chromosomes, and executing Step 3-2-2 from chromosome counting t=1.

Step 3-2-2: finding the operation units of which there is no immediate predecessor operation or of which the immediate predecessor operation is assigned to the corresponding chromosomes, and adding the operation units to an assignable operation unit set S.

Step 3-2-3: calculating difference between an upper limit high-level of the operation interval corresponding to each operation unit in the assignable operation unit set S and a first gene position n of a currently unassigned operation unit, to obtain a difference set.

Step 3-2-4: sorting each difference in the difference set in an ascending order, selecting the operation unit i corresponding to the difference at the first position of the order and assigning the operation unit i to the position of the $n_{th}$ gene of the chromosome, deleting the operation unit i from the operation unit set S, at the same time, updating the $i^{th}$ row of elements of the corresponding columns of all immediate successor operations of the operation units i in the priority relationship matrix as 0, and making n=n+1.

Step 3-2-5: judging whether n≤N or not, if yes, executing the Step 3-2-2, or else, executing Step 3-2-6.

Step 3-2-6: making t=t+1, judging whether t≤Z or not, wherein Z is the population size, if yes, making n=1 and executing the Step 3-2-2, or else, executing Step 3-3.

Step 3-3: searching the minimum bottleneck time in the assignment order of the operation units in each chromosome, and according to the minimum bottleneck time, assigning all of the operation units assigned in each chromosome to the given m workstations according to the positions of respective chromosome genes, so that the feasible solution of the assembly line balancing problem of the type-A computer, corresponding to each chromosome, is obtained.

Further, according to the second type computer assembly line balancing optimization method based on a migration genetic algorithm, a method for searching the minimum bottleneck time in the assignment order of the operation units in each chromosome comprises the following steps:

Step 3-3-1: calculating the theoretical minimum bottleneck time CT of the feasible solution corresponding to each chromosome.

Step 3-3-2: according to the current minimum bottleneck time CT, assigning all of the operation units assigned in each chromosome to the given m workstations according to the position of the respective chromosome gene, performing calculating and obtaining a tact time set $\{TT_i\}$, (i=1, 2, 3, ..., m) of the m workstations, judging whether $\max\{TT_i\} \leq CT$ is met or not, if yes, determining that the current minimum bottleneck time is the actual minimum bottleneck time under the sorting of all of the operation units in the chromosome, or else, executing Step 3-3-3.

Step 3-3-3: calculating potential increment $\Delta T_i$ of the tact time of each workstation, wherein $\Delta T_i$ expresses the standard operation time of the first operation unit on the $i+1_{th}$ workstation, then $\Delta T_m = 0$.

Step 3-3-4: making $CT = \max\{TT_i + \Delta T_i\}$, $C = \max\{TT_i\}$, judging whether $C \leq CT$ is met or not, if yes, determining that the current minimum bottleneck time CT is the actual minimum bottleneck time under the sorting of all the operation units in the chromosome, or else, executing the Step 3-3-2.

Further, according to the second type computer assembly line balancing optimization method based on a migration genetic algorithm, the Step 4 further comprises the following steps:

Step 4-1: setting reproduction generation count M and saving count r=0, and calculating the balancing rate percent of the initial population, wherein the balancing rate of the population is a mean value of the values of the fitness function of all of the chromosomes in the population, and a fitness function adopts an existing assembly line balancing rate solving equation.

Step 4-2: performing reproduction operation on the current population, optimizing each feasible solution of the assembly line balancing problem of the type-A computer, and calculating the balancing rate percent1 of the population obtained by current L-generation reproduction operation.

Step 4-3: judging whether percent1—percent is bigger than or equal to a preset balancing rate increase threshold or not, if yes, taking out the k chromosomes with the values of the fitness function greater than a preset threshold from the current L-generation population, performing saving, and recording the current saving count as r=r+1.

Step 4-4: judging whether the ratio of L to a preset interval generation count threshold is an integer or not, if yes, taking out the h chromosomes with the values of the fitness function greater than the preset threshold in the current L-generation population and performing saving.

Step 4-5: judging whether $L \leq M$ or not, if yes, executing the Step 4-2, or else, executing the Step 5.

Further, according to the second type computer assembly line balancing optimization method based on a migration genetic algorithm, the Step 5 further comprises the following steps:

Step 5-1: performing processing on the assembly operation unit of the type-B computer corresponding to the assembly operation unit of the type-A computer, specifically comprising splitting or merging the assembly operation units of the type-B computer by referring to the corresponding assembly operation units of the type-A computer, wherein the split or merged assembly operation units and the assembly operation units corresponding to the assembly of the type-A computer shall meet the requirements that the operation units are similar and the standard operation time is close, otherwise the assembly operation units of the type-B computer shall not be split or merged, and the serial numbers of the split or merged assembly operation units of the type-B computer are changed into serial numbers of the assembly operation units of the type-A computer.

Step 5-2: sorting the assembly operation units of the type-A computer and the assembly operation units of the type-B computer, which are not subjected to corresponding processing, in an ascending order of the standard operation time respectively, then corresponding the sorted assembly operation units of the type-A computer and the type-B computer in an one-to-one manner, deleting redundant operation units of the assembly operation units of the type-A computer after correspondence, relative to the assembly operation units of the type-B computer, wherein the expression form of deleting the redundant operation units of the type-A computer in the external solution set is to delete genes with the same serial number as the redundant operation units in the external solution set, and after deleting operation is executed, changing the serial numbers of the assembly operation units of the type-B computer into the serial numbers of the assembly operation units of the type-A computer.

Step 5-3: according to the assembly operation sequence and the operation interval of the type-B computer, acquired in the Step 1, and the experience of assemblers, setting the new operation sequence and the operation interval of the assembly process of the type-B computer after changing the serial numbers of the operation units, constructing the priority relationship matrix by the new operation sequence of the assembly process of the type-B computer, and expressing the new operation interval of the assembly process of the type-B computer in the form of upper and lower limits.

Step 5-4: adjusting the external solution set obtained in the Step 5-2 by using the priority relationship matrix and the operation interval of the assembly process of the type-B computer, obtained in the Step 5-3, including: exchanging the corresponding positions of the genes of paired operation units which do not conform to the operation sequence, in each chromosome of the external solution set, and exchanging the positions of the genes which do not meet the constraints of the operation interval in each chromosome and the genes which do not have the constraints of the operation interval in the chromosome or the genes of which the operation interval span is greater than the preset threshold, in the external solution set.

Step 5-5: checking whether the chromosomes in the external solution set adjusted in the Step 5-4 meet the two constraints of the operation sequence and the operation interval of the assembly process of the type-B computer, obtained in the Step 5-3, and deleting the chromosomes which do not meet the constraints to form a new external solution set which fully conforms with the constraints.

Further, according to the second type computer assembly line balancing optimization method based on a migration genetic algorithm, the similarity of the assembly process of the type-A computer and the type-B computer is calculated according to the following equation:

$$\text{Sim} = (\text{Fitness} - w_1 \lim_1 - w_2 \lim_2) * 100\% \quad (9)$$

wherein, Sim is the similarity of the assembly process of the type-A computer and the type-B computer; Fitness is the mean value of the values of the fitness function of all of the chromosomes in the external solution set obtained in the Step 5-5; $\lim_1=Z_1/l$, l is the number of the chromosomes randomly selected from the external solution set obtained in the Step 5-2, and $Z_1$ is the number of times that the l chromosomes exchange the positions of the paired operation units that do not conform to operation sequence at the positions of genes corresponding to the chromosomes; and $\lim_2=Z_2/l$, $Z_2$ is the number of times that chromosomes exchange the positions of the genes which do not meet the constraints of the operation interval in each chromosome and the genes which do not have the constraints of the operation interval in the l chromosomes or the genes of which the operation interval span is greater than the preset threshold; and $w_1$ and $w_2$ are respectively weights of $\lim_1$ and $\lim_2$.

Further, according to the second type computer assembly line balancing optimization method based on a migration genetic algorithm, W is equal to a product of the similarity Sim of the assembly process of the type-A computer and the type-B computer and the initial population size of the preset assembly line balancing problem of the type-B computer.

Compared with the prior art, the method has the following beneficial effects:

In view of continuous development of flexible production and flexible manufacturing, and the condition that manufacturing enterprises often need to meet requirements for a large number of diversified orders, the production process involved in a large number of personalized orders is very complex and changeable, and the production line needs to be switched frequently, the method disclosed by the present invention uses assembly experience of similar assembly lines, the feasible solution set of the known assembly lines is transferred to the initial solution set of the assembly line balancing problem to be optimized, due to the migration of high-quality feasible solutions, the method can effectively reduce the sensitivity of the algorithm performance to the initial value and parameters, and improve the lower limit of the local optimal feasible solution of the heuristic algorithm to solve the assembly line balancing problem. Besides, compared with the existing methods for solving the assembly line balancing problem, the method can increase convergence speed, shorten execution time, and obtain high-quality feasible solutions more quickly, thereby optimizing the assembly line balancing problem of the computers, reducing the production cost of the computers, improving the assembly quality of the computers, shortening the production cycle of the computers, and helping the development of discrete manufacturing assembly technologies.

DETAILED DESCRIPTION OF THE PREFERRED EMBODIMENT

The technical solutions in the embodiments of the present invention will be clearly and completely described below with reference to the accompanying drawings in the embodiments of the present invention. Obviously, the embodiments are only a part of the embodiments of the present invention, but not all of the embodiments. Based on the embodiments of the present invention, all other embodiments obtained by those of ordinary skilled in the art without creative efforts shall fall within the protection scope of the present invention.

Figure 1:
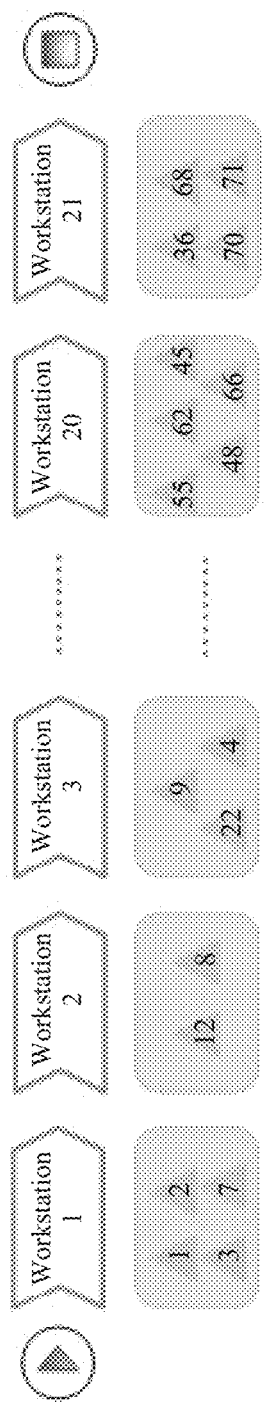
FIG. 1 is an assembly line balancing schematic diagram of computers according to an embodiment of the present invention.

In the embodiments of the present invention, the assembly line balancing simplified structure of computers is shown as FIG. 1. The assembly line balancing problem of computers solved in the embodiments is based on that two constraints of the operation sequence and the operation interval are met, the number of the workstations of the assembly line is given, and all of the operation units are assembled on the workstations of given number, so that the bottleneck time of the assembly line is minimum, the free time of the workstations is shortened, periods of all of the workstations completing all contents in respective stations are balanced relatively, and maximum balancing rate is obtained, thereby reducing the production cost of the computers, improving the assembly quality of the computers, shortening the production cycle of the computers, and improving the production efficiency of the enterprises.

The workstations are also called work stations, are the most basic production units in the production process, and personnel, materials and equipment are arranged in the work stations for production and assembly. The operations units are operation elements, and are the smallest or inseparable operation units of the assembly line.

The bottleneck time is the maximum tact time in all the workstations of the assembly line, and the tact time is the time taken from the start of the first operation to the completion of the last operation in the workstations.

The operation sequence means that the product assembly process needs to be in a certain order, during the assembly process, one operation unit performs an operation only when all of the previous operation units have completed their operations.

The operation interval refers to that one operation unit needs to be placed on the relative position range of the required assembly line due to the limitations of the production process, assembly personnel, assembly tools, and the like, during the product assembly process. For example, the assembly process comprises 10 operation units, and the operation interval of one operation unit is 3-6, that is, after the assembly line operation units are sorted, at least 2 operation units are required before the operation unit, and at least 4 operations follow the operation unit.

The assembly line balancing rate expresses the assembly line balancing degree. The higher the balancing rate, the more balanced the assembly line is. The balancing rate is calculated according to equation (1):

$$P = \frac{\sum_{i=1}^{m} T_i}{m \times CT} \times 100\%, \qquad (1)$$

wherein, P is the balancing rate of the assembly line, $T_i$ is the $i_{th}$ standard operation time, m is the number of the workstations, and CT is the bottleneck time and is the maximum time taken by all the workstations to complete the operations in the stations.

Figure 2:
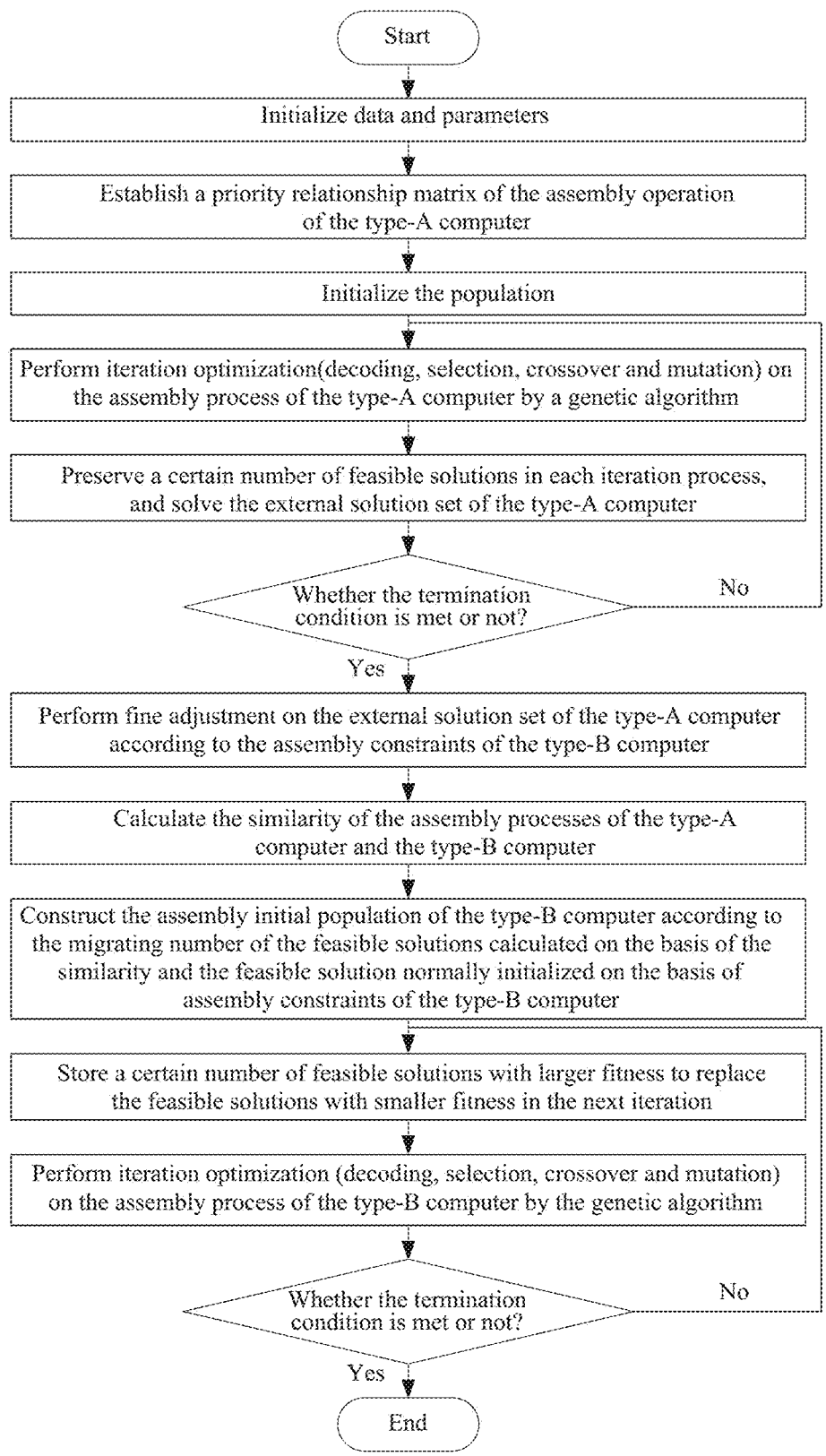
FIG. 2 is the schematic flow chart of a second type computer assembly line balancing optimization method based on a migration genetic algorithm, according to the present invention.

FIG. 2 is the schematic flow chart of the second type computer assembly line balancing optimization method based on a migration genetic algorithm, according to the present invention, as shown in FIG. 2, the method comprises the following steps:

Step 1: acquiring data of a production line assembly process of a type-A computer and a type-B computer, and expressing data of operation sequence, standard operation time and operation interval in a matrix form.

In the embodiments, the assembly process of the type-A computer comprises 71 operation units, the assembly process of the type-B computer comprises 66 operation units, and the assembly processes of the type-A computer and the type-B computer comprise many of the same operation units. The data of the assembly process comprises the number of assembly line workstations m=21, the operation sequence (obtained by referring to FIG. 3 and on-site assembly experience), the serial number of the operation units (the serial number in Table 1), the standard operation time and the operation interval. Table 1 shows relevant data content of the first 10 operation units in the assembly process of the type-A computer.

Wherein the operation sequence, the standard operation time and the operation interval need to be expressed in the matrix form so that the computer can perform processing, as follows, the operation sequence is expressed as the matrix form shown as the equation (2):

$$\text{branch} = \begin{bmatrix} 17 & 18 \\ 24 & 25 \\ 25 & 28 \\ 28 & 31 \\ 31 & 38 \\ 23 & 29 \\ \ldots \ldots \end{bmatrix} \qquad (2)$$

The meaning of the above equation is: the operation unit with the serial number of 18 needs to be completed after the operation unit 17, that is, the operation unit 17 is the immediate predecessor operation of the operation unit 18; and the operation unit with the serial number of 25 needs to be completed after the operation unit 24, that is, the operation unit 24 is the immediate predecessor operation of the operation unit 25 and so on.

The standard operation time is expressed as the matrix form shown as the equation (3):

$$\text{Time} = [2.50\ 3.00\ 4.00\ 3.50\ 3.50\ 3.00\ 5.00\ 8.00\ 6.00\ 2.50 \ldots] \qquad (3),$$

wherein, elements in the Time matrix performs one-to-one correspondence with the standard operation time in the Table 1.

The upper limit high-level of the operation interval is expressed in the matrix format form as shown in equation

TABLE 1

Ten groups of data of assembly operation of type-A computer

| Serial number | Relevant parts | Operation unit | Standard time (second) | Operation interval |
|---|---|---|---|---|
| 1 | Case | Disassemble side plate screws | 2.50 | 1 |
| 2 | Case | Remove a side panel, and place the side panel to the designated position of a tooling panel | 3.00 | 2 |
| 3 | Case | Remove a front panel, and place the front panel to the designated position of the tooling panel | 4.00 | 3 |
| 4 | Case | Remove panel CD-Drive baffle | 3.50 | 4-71 |
| 5 | Case | Remove a hard drive bracket and place the hard drive bracket on the tooling panel | 3.50 | 5 |
| 6 | Case | Remove a front bracket and place the front bracket at a position 5 CM-8 CM away from the case | 3.00 | 6 |
| 7 | Baffle | Install the IO baffle to the position of the IO interface of the case | 5.00 | 7 |
| 8 | Antenna | Take the Wifi antenna, enable it to penetrate through the case, tear off the backing paper of an antenna head, and install the antenna to the front panel of the case | 8.00 | 8-71 |
| 9 | Motherboard | Take the motherboard, install the motherboard in the case, and install 2 positioning holes of the motherboard into positioning columns | 6.00 | 9 |
| 10 | rear label | Take the rear label on the motherboard, and paste the real label to the designated position on the tooling panel | 2.50 | 10 |

(4), and the lower limit low-level of the operation interval is expressed in the matrix form as shown in the equation (5):

$$\text{low-level}=[1,2,3,4,5,6,7,8,9,10\ldots] \quad (4),$$

$$\text{high-level}=[1,2,3,71,5,6,7,71,9,10\ldots] \quad (5),$$

wherein, elements in the low-level and high-level matrices perform one-to-one correspondence with the operation interval in the Table 1.

Step 2: according to a matrix branch expressing the operation sequence of the assembly process of the type-A computer, constructing a priority relationship matrix Matrix of the assembly process of the type-A computer.

Figure 3:
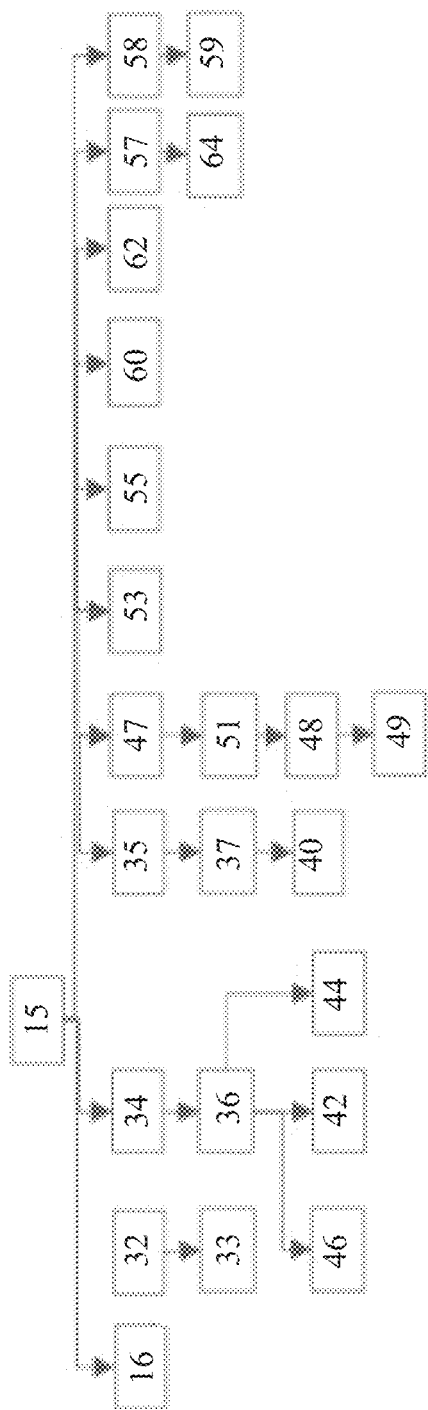
FIG. 3 is a schematic diagram of an operation sequence of an assembly line of computers according to an embodiment of the present invention.

Since the operation sequence as shown in the figures, such as FIG. 3, cannot directly participate in the arithmetic operation in the computer, it is necessary to express the operation sequence as shown in the figures in the form of a priority relationship matrix, so that the computer can perform processing, and the sequence relationship between operations in the solution process is guaranteed, wherein the number of rows and columns of the matrix is the total number of operation units in the operation sequence, namely 71; in the priority relationship matrix with 71 rows and 71 columns, if the operation unit i is the immediate predecessor operation of the operation unit j, then the $i_{th}$ row and the $j_{th}$ column of the matrix are 1, otherwise the value is 0. In the embodiment, the priority relationship matrix of the assembly problem of the type-A computer is a 71*71 asymmetric square matrix as shown in equation (6):

$$\text{Matrix} = \begin{bmatrix} 0 & 0 & 0 & 0 & 1 & 0 & 0 & \cdots & 0 & 0 \\ 0 & 0 & 0 & 0 & 0 & 1 & 0 & \cdots & 0 & 0 \\ 0 & 0 & 0 & 0 & 0 & 0 & 1 & \cdots & 0 & 0 \\ 0 & 0 & 0 & 0 & 0 & 0 & 0 & \cdots & 0 & 0 \\ 0 & 0 & 0 & 0 & 0 & 0 & 0 & \cdots & 0 & 0 \\ 0 & 0 & 0 & 0 & 0 & 0 & 0 & \cdots & 0 & 0 \\ 0 & 0 & 0 & 0 & 0 & 0 & 0 & \cdots & 0 & 0 \\ \cdots & \cdots & \cdots & \cdots & \cdots & \cdots & \cdots & \cdots & \cdots & \cdots \\ 0 & 0 & 0 & 0 & 0 & 0 & 0 & \cdots & 0 & 0 \\ 0 & 0 & 0 & 0 & 0 & 0 & 0 & \cdots & 0 & 0 \end{bmatrix} \quad (6)$$

Step 3: according to the priority relationship matrix Matrix of the assembly process of the type-A computer and the operation interval expressed in the matrix form, initializing the population of the genetic algorithm, and initializing relevant parameters of the genetic algorithm, wherein each chromosome in an initial population obtained by the initialization corresponds to one feasible solution to the assembly line balancing problem of the type-A computer.

Step 3-1: Initializing the relevant parameters of the genetic algorithm, the relevant parameters comprising the number of initial populations, the population size, the number of exchange genes, the crossover probability of populations, and the mutation probability of populations.

In the embodiment, the number of initial populations is 2, the number of chromosomes in the initial population 1 is 150, the number of chromosomes in the initial population 2 is 150, the crossover probability of the initial population 1 is 0.2, the crossover probability of the initial population 2 is 0.5, the crossover probability of the initial population 1 is 0.5, the mutation probability of the initial population 2 is 0.2, and the number of the exchange genes is 10.

Step 3-2: initializing the population by using the operation sequence and the operation interval as constraints according to the priority relationship matrix obtained in the Step 2 and the matrix form of the operation interval obtained in the Step 1, to ensure that each chromosome corresponds to one feasible solution of the assembly line balancing problem of the type-A computer.

The feasible solution of the assembly line balancing problem lies in that under the condition that all operation units meet the operation sequence and the operation interval, each operation unit is randomly generated each time at the set position of the assembly line, all the operation units are assigned on the assembly line according to respective set positions, one feasible solution is obtained each time, and each chromosome corresponds to one feasible solution in the present invention. Since the serial number of the operation units is expressed by an integer, and the feasible solution of the assembly line balancing problem is expressed in an integer coding manner, so that the length of the chromosome is equal to the total number of the operation units. For example, a certain assembly line contains 8 operation units, then a randomly generated chromosome coding form is expressed as: 5 2 3 1 8 7 6 4, then it can be seen that the assembly line follows the operation order of 5, 2, 3, 1, 8, 7, 6, 4, and the operation units are assigned in the operation order.

When the initial population is generated, it is necessary to take the operation sequence and the operation interval as the constraints and guarantee the condition that each generated chromosome corresponds to one feasible solution of the problem, and the generation manner of the chromosomes enables the randomly generated chromosomes to cover the entire solution space.

It is necessary to generate the chromosomes in the initial population according to the priority relationship matrix generated in the Step 2 and the matrix form of the operation interval obtained in the Step 1, and initialize the population, the specific method comprises the following steps:

Step 3-2-1: taking the total number of the operation units in the assembly process of the type-A computer as a length N of the chromosomes, and executing Step 3-2-2 from chromosome counting t=1.

In the embodiment, according to the Step 3-1, the number of the chromosomes in the initial population 1 is 150, the number of chromosomes in the initial population 2 is 150, and the obtained population size Z is 150. The data of the production line assembly process of the type-A computer and the type-B computer determine the length of the chromosome as N=71.

Step 3-2-2: finding the operation units of which there is no immediate predecessor operation or of which the immediate predecessor operation is assigned to the corresponding chromosomes, and adding the operation units to an assignable operation unit set S.

The operation unit i of which there is no immediate predecessor operation or of which the immediate predecessor operation is assigned is expressed in the priority relationship matrix of the operation units as the corresponding columns in the matrix as all being 0.

Step 3-2-3: calculating difference between an upper limit high-level of the operation interval corresponding to each operation unit in the assignable operation unit set S and the position n of a first gene of a currently unassigned operation unit, to obtain a difference set.

The difference set expresses the distance between each operation unit in the assignment operation unit set S and the corresponding upper limit of the operation interval, the smaller the distance, the faster the corresponding operation unit should be assigned to the corresponding chromosome, so as to prevent assigning operations outside the operation interval to enable the constraints of the operation interval not to be met.

Step 3-2-4: sorting each difference in the difference set in an ascending order, selecting the operation unit i corresponding to the difference at the first position and assigning the operation unit to the position of the $n_{th}$ gene of the chromosome, deleting the operation unit i from the operation unit set S, at the same time, updating the $i_{th}$ row of elements of the corresponding columns of all immediate successor operations of the operation units i in the priority relationship matrix as 0, and making n=n+1.

Step 3-2-5: judging whether n≤N or not, if yes, executing the Step 3-2-2, or else, executing Step 3-2-6.

Step 3-2-6: making t=t+1, judging whether t≤Z or not, if yes, making n=1 and executing the Step 3-2-2, or else, executing Step 3-3, wherein in the embodiment, the population size Z is 150.

Step 3-3: searching the minimum bottleneck time in the assignment order of the operation units in each chromosome, and according to the minimum bottleneck time, assigning all the operation units assigned in each chromosome to the given m workstations according to the positions of respective chromosome genes, so that the feasible solution of the assembly line balancing problem of the type-A computer, corresponding to each chromosome, is obtained.

Since the initialization process of the populations in the Step 3-2 does not assign the operation units to the workstations, but just arrange all the operation units in order, and the specific operation units contained in each workstation are unknown, therefore, in the present step, deduction needs to be performed according to the assignment order of the operation units when the populations are initialized, and the minimum bottleneck time in the assignment order of the operation units in each chromosome is searched, which specifically comprises the following steps:

Step 3-3-1: calculating the theoretical minimum bottleneck time of the feasible solution corresponding to each chromosome according to the equation (7):

$$CT = \frac{\sum_{i=1}^{N} T_i}{m}, \quad (7)$$

wherein $$\sum_{i=1}^{N} T_i$$

is the sum of the standard operation time of all operation units, and m is the number of workstations.

Step 3-3-2: according to the current minimum bottleneck time CT, assigning all the operation units assigned in each chromosome to the given m workstations according to the position of the respective chromosome gene, calculating and obtaining a tact time set $\{TT_i\}$, (i=1, 2, 3 ..., m) of the m workstations, judging whether max$\{TT_i\}$≤CT (i=1, 2, 3 ..., m) is met or not, if yes, determining that the current minimum bottleneck time CT is the actual minimum bottleneck time under the sorting of all the operation units in the chromosome, or else, executing Step 3-3-3.

Step 3-3-3: calculating potential increment $\Delta T_i$ (i=1, 2, 3 ..., m) of the tact time of each workstation, wherein $\Delta T_i$ expresses the standard operation time of the first operation unit on the i+1$_{th}$ workstation, thus, $\Delta T_m$=0.

Step 3-3-4: making CT=max$\{TT_i+\Delta T_i\}$, C=max$\{TT_i\}$, judging whether C≤CT is met or not, if yes, determining that the current minimum bottleneck time CT is the actual minimum bottleneck time under the sorting of all the operation units in the chromosome, or else, executing the Step 3-3-2.

Step 4: reproducing the initial populations, and searching and storing high-quality feasible solutions in the populations in the process of population reproduction, wherein all high-quality feasible solutions form an external solution set of the assembly line balancing problem of the type-A computer.

The external solution set is a high-quality feasible solution set consisting of a certain number of chromosomes with higher values of the fitness function in the populations during the continuous reproduction of the initial populations, that is, high-quality feasible solutions. In order to ensure the diversity of the feasible solutions in the external solution set, under two conditions of the entire population reproduction process and the population reproduction process before balancing rate curve convergence of the assembly line of the computers, the high-quality feasible solutions for the chromosomes with higher values of the fitness function in the populations are searched and stored to form the external solution set.

Step 4-1: Setting the reproduction generation count M and saving count r=0, and calculating the balancing rate percent of the initial populations, wherein in the embodiment, the reproduction generation count is set to 500. The balancing rate of the populations is the mean value of the fitness function of all chromosomes in the populations.

The fitness function of the assembly line balancing problem of the computers is the equation for calculating the balancing rate of the assembly line. According to the designed fitness function, the individuals in the group are differentiated. The fitness function in the embodiment directly uses the balancing rate solving equation of the existing assembly line is shown as equation (8):

$$P = \frac{\sum_{i=1}^{m} T_i}{m \times CT} \times 100\%, \quad (8)$$

wherein, P is the balancing rate, $T_i$ is the $i_{th}$ standard operation time, m is the number of the workstations, and CT is the bottleneck time of the feasible solution corresponding to each chromosome.

In the embodiment, the balancing rate calculation result of the initial population is 81%, namely percent=81%.

Step 4-2: performing reproduction operation on the current population, performing crossover, mutation, selection, and optimal retention operations, optimizing each feasible solution of the assembly line balancing problem of the type-A computer, and calculating the balancing rate percent1 of the population obtained by current L-generation reproduction operation.

Step 4-3: judging whether percent1—percent is bigger than or equal to preset balancing rate increase threshold or not, if yes, taking out the k chromosomes with the values of the fitness function greater than the preset threshold from the current L-generation population, performing saving, and recording the current saving count as r=r+1.

In the embodiment, the preset balancing rate increase threshold is 2%, the steps in the embodiment determine whether percent1−percent≥0.02 or not, if yes, taking out k chromosomes with higher values of the fitness function in the current populations and saving the chromosomes. In the embodiment, k=10*r, r is the current saving count, as the population balancing rate increases, the number of the chromosomes taken out in the populations also increases.

Step 4-4: judging whether the ratio of L to a preset interval generation count threshold is an integer or not, if yes, taking out the h chromosomes with the values of the fitness function greater than the preset threshold in the current L-generation population and performing saving.

In the embodiment, the preset threshold of the interval generation count is set to 50. That is, during the entire process of population reproduction, a fixed number of better feasible solutions are selected from the population for storage at every interval of the same population reproduction times. In the embodiment, h=50, the number of population reproduction times is 500, and each time the population reproduces for 50 generations, 50 feasible solutions with optimal values of the fitness function are extracted from the population.

Step 4-5: judging whether L≤M or not, if yes, executing the Step 4-2, or else, executing Step 5.

In the embodiment, the balancing rate of the initial population is 81%, and each time the balancing rate of the population increases by 2% or more, the Step 4-3 is performed to store feasible solutions 5 times in the final embodiment, and the number of the chromosomes stored each time is 10, 20, 30, 40 and 50, and a total of 150 chromosomes with higher values of the fitness function are stored; the Step 4-4 is performed to store a total of 500 chromosomes with higher values of the fitness function, which are combined with the feasible solutions stored in the Step 4-3 together to form a total of 650 external solution sets.

Step 5: splitting or merging assembly operation units of the type-B computer, making corresponding processing to assembly operation units of the type-A computer, and after processing, adjusting the external solution set of the assembly line balancing problem of the type-A computer, so that the adjusted external solution set meets the technological requirements of the assembly line of the type-B computer, including the operation sequence and the operation interval of the assembly line of the type-B computer.

Step 5-1: performing processing on the assembly operation unit of the type-B computer corresponding to the assembly operation unit of the type-A computer, specifically comprising splitting or merging the assembly operation units of the type-B computer by referring to the corresponding assembly operation units of the type-A computer, wherein the split or merged assembly operation units and the assembly operation units corresponding to the assembly of the type-A computer shall meet the requirements that the operation units are similar and the standard operation time is close, otherwise the assembly operation units of the type-B computer shall not be split or merged, and the serial numbers of the split or merged assembly operation units of the type-B computer are changed into serial numbers of the assembly operation units of the type-A computer.

A large number of identical operation units exit in the assembly process of different types of computers, for the same operation unit, the assembly operation units of the type-B computer are split or merged by referring to the assembly operation units of the type-A computer, for example, in the assembly process of the type-B computer, the operation unit with the serial number of 34 corresponds to the operations of "scanning rear marks, power supply, CPU radiator, Wifi card, and FRU label barcode binding", while in the assembly process of the type-A computer, "scanning rear marks, power supply, CPU radiator, Wifi card, FRU label barcode binding" corresponds to the four operation units with the serial numbers of 36, 37, 38 and 39, and therefore, the operation unit with the serial number of 34 in the assembly process of the type-B computer is split into 4 operation units to correspond to the four operation units with the assembly serial numbers of 36, 37, 38 and 39 of the type-A computer, that is the serial numbers of the four operation units split from the operation unit with the serial number of 34 in the assembly process of the type-B computer are also changed to correspond to the serial numbers of 36, 37, 38 and 39 of the assembly operation of the type-A computer (it should be noted that the operation units of the type-B computer, after being split or merged, and the assembly operation units corresponding to the type-A computer shall meet two requirements that operation units are similar and standard operation time is close, otherwise, the type-B computer shall not be subjected to splitting or merging operation); in this way and taking into account the assembly technology of the computers, the assembly operations of the type-B computer are reasonably merged or split, and the split or merged assembly operation units of the type-B computers are in one-to-one correspondence to the similar assembly operation units of the type-A computers, and the serial numbers of the split or merged assembly operations of the type-B computer are changed to the serial numbers corresponding to the assembly operation of the type-A computer.

Step 5-2: sorting the assembly operation units of the type-A computer and the assembly operation units of the type-B computer, which are not subjected to corresponding processing, in an ascending order of the standard operation time respectively, then corresponding the sorted assembly operation units of the type-A computer and the type-B computer in an one-to-one manner, deleting redundant operation units of the assembly operation units of the type-A computer after correspondence, relative to the assembly operation units of the type-B computer, wherein the expression form of deleting the redundant operation units of the type-A computer in the external solution set is to delete genes with the same serial number as the redundant operation units in the external solution set, and after deleting operation is executed, changing the serial numbers of the assembly operation units of the type-B computer into the serial numbers of the assembly operation units of the type-A computer.

In the embodiment, after the Steps 5-1 and 5-2 are performed, after all the assembly operations of the type-B computer correspond to the corresponding assembly operations of the type-A computer, the type-A computer still has 5 redundant assembly operations relative to the type-B computer, and the redundant assembly operations of the type-A computer are deleted. The expression form of the external solution set obtained in the Step 4 by deleting the redundant assembly operations of the type-A computer is that genes with the same serial number as the redundant operations in the external solution set are deleted, and because the example adopts an integer coding manner, and each operation is expressed by a number, namely the serial number in Table 1, thus, the expression manner is that the genes with the same serial number as the redundant operations in the external solution set are deleted to obtain the external solution set after deleting the sequence numbers corresponding to the redundant operations.

Step 5-3: according to the assembly operation sequence and the operation interval of the type-B computer in the Step 1, and the experience of assemblers, setting the new operation sequence and the operation interval of the assembly process of the type-B computer after changing the original serial number, constructing the priority relationship matrix by the new operation sequence of the assembly operation of the type-B computer, and expressing the new operation interval of the type-B computer in the form of upper and lower limits, wherein low-level-B expresses the lower limit of the operation interval, and high-level-B expresses the upper limit of the operation interval.

After the Steps 5-1 and 5-2 (splitting and merging operations and changing the operation serial numbers of the type-B computer assembly into the operation serial numbers corresponding to the type-A computer assembly) are performed for the assembly operation of the type-B computer, the original assembly serial number of the type-B computer are changed, and the two limits of the operation sequence and the operation interval under the original assembly serial number of the type-B computer are broken.

Step 5-4: performing fine adjustment on the external solution set obtained in the Step 5-2 by using the priority relationship matrix and the operation interval of the assembly operation of the type-B computer, obtained in the Step 5-3.

Step 5-4-1: exchanging the corresponding positions of genes in each chromosome of the external solution set of paired operation units which do not conform to the operation sequence.

The operation units limited by the operation sequence appear in pairs in the embodiment, such as the matrix branch in the Step 1, and the two operation units in each row, that is, the front and rear positions of the operation unit pair, express the front and rear relationship of the operation unit pair.

Step 5-4-2: exchanging the positions of the genes which do not meet the constraints of the operation interval in each chromosome and the genes which do not have the constraints of the operation interval in the chromosome or the genes of which the operation interval span is greater than the preset threshold, in the external solution set.

Step 5-5: checking whether the chromosomes in the external solution set subjected to fine adjustment in the Step 5-4 meet the two constraints of the operation sequence and the operation interval of the assembly process of the type-B computer, obtained in the Step 5-3, and deleting the chromosomes which do not meet the constraints to form a new external solution set that fully conforming with the constraints of the assembly process of the type-B computer.

Step 6: calculating a similarity of the assembly process of the type-A computer and the type-B computer by comprehensively considering three factors of the standard operation time, the operation sequence and the operation interval:

$$\text{Sim} = (\text{Fitness} - w_1 \lim_1 - w_2 \lim_2) * 100\% \qquad (9),$$

wherein, Sim is the similarity of the assembly process of the type-A computer and the type-B computer; Fitness is the mean value of the values of the fitness function of all of the chromosomes in the external solution set obtained in the Step 5-5; $\lim_1 = Z_1/l$, l is the number of the chromosomes randomly selected from the external solution set obtained in the Step 5-2, in the embodiment, 10 chromosomes are randomly selected from the external solution set obtained in the Step 5-2, and $Z_1$ is the number of times of performing the Step 5-4-1 for the 10 chromosomes, namely exchanging the positions of the operation unit pairs that do not conform to the operation sequence at the positions of genes corresponding to the chromosomes; $\lim_3 = Z_2/l$, 10 chromosomes are randomly selected from the external solution set obtained in the Step 5-2, $Z_2$ is the number of times of performing the Step 5-4-2 for the 10 chromosomes, namely the number of times of exchanging the positions of the genes which do not meet the constraints of the operation interval in each chromosome and the genes which do not have the constraints of the operation interval in the chromosomes or the genes of which the operation interval span is greater than the preset threshold; $w_1$ and $w_2$, are the respective weights of $\lim_1$ and $\lim_2$, and different values are given according to the characteristics of the assembly line of the different types of computers.

In the embodiment, Fitness is 0.85, $\lim_1$ is 15.3, $\lim_2$ is 29.2, $w_1$ and $w_2$ are both 0.01, and Sim is 40.5%.

Step 7: calculating a value of a fitness function of each chromosome in the external solution set obtained in Step 5, selecting W chromosomes with the largest values of the fitness function from the external solution set, and forming a high-quality feasible solution set to the assembly line balancing problem of the type-B computer, wherein W is determined according to the similarity of the assembly process of the type-A computer and the type-B computer calculated in the Step 6, wherein W=Sim*150, Sim is the similarity of the assembly process of the type-A computer and the type-B computer, and 150, obtained in Step 6, is the number of chromosomes in the initial population of the preset assembly line balancing problem of the type-B computer. In the examples, the value of Sim is 40.5%, and the value of W is 61.

Step 8: initializing U chromosomes according to the new operation sequence and the operation interval of the assembly operation of the type-B computer, and combining the high-quality feasible solution set of the assembly line balancing problem of the type-B computer with the U chromosomes to form the initial population of the assembly line balancing problem of the type-B computer, wherein each chromosome in the initial population corresponds to one feasible solution of the assembly line balancing problem of the type-B computer.

The initial population includes the high quality chromosome set obtained in the Step 7 and U chromosomes are initialized according to the method of the Step 3 according to the new priority relationship matrix and the operation interval of the type-B computer, wherein U=150−W, W is the number of migrating the chromosomes calculated in the Step 7, and in the embodiment, the U is 89.

Step 9: performing a preset number of reproduction operations on the initial population of the assembly line balancing problem of the type-B computer, continuously introducing high-quality feasible solutions in the population reproduction process, and optimizing the feasible solution of the assembly line balancing problem of the type-B computer so as to obtain the optimal solution set of the assembly line balancing problem of the type-B computer.

The Step 9 specifically comprises: performing continuous reproduction on the initial population of the assembly line balancing problem of the type-B computer by methods of selection, crossover, mutation, and optimal retention methods, and selecting preset Q (Q is 5 in the embodiment) feasible solutions with the largest values of the fitness function during each population reproduction process to optimize the feasible solution of the assembly line balancing problem of the type-B computer by replacing Q feasible solutions with the smallest value of the fitness function in the next reproduction population so as to finally obtain the optimal solution set of the assembly line balancing problem of the type-B computer.

Figure 4:
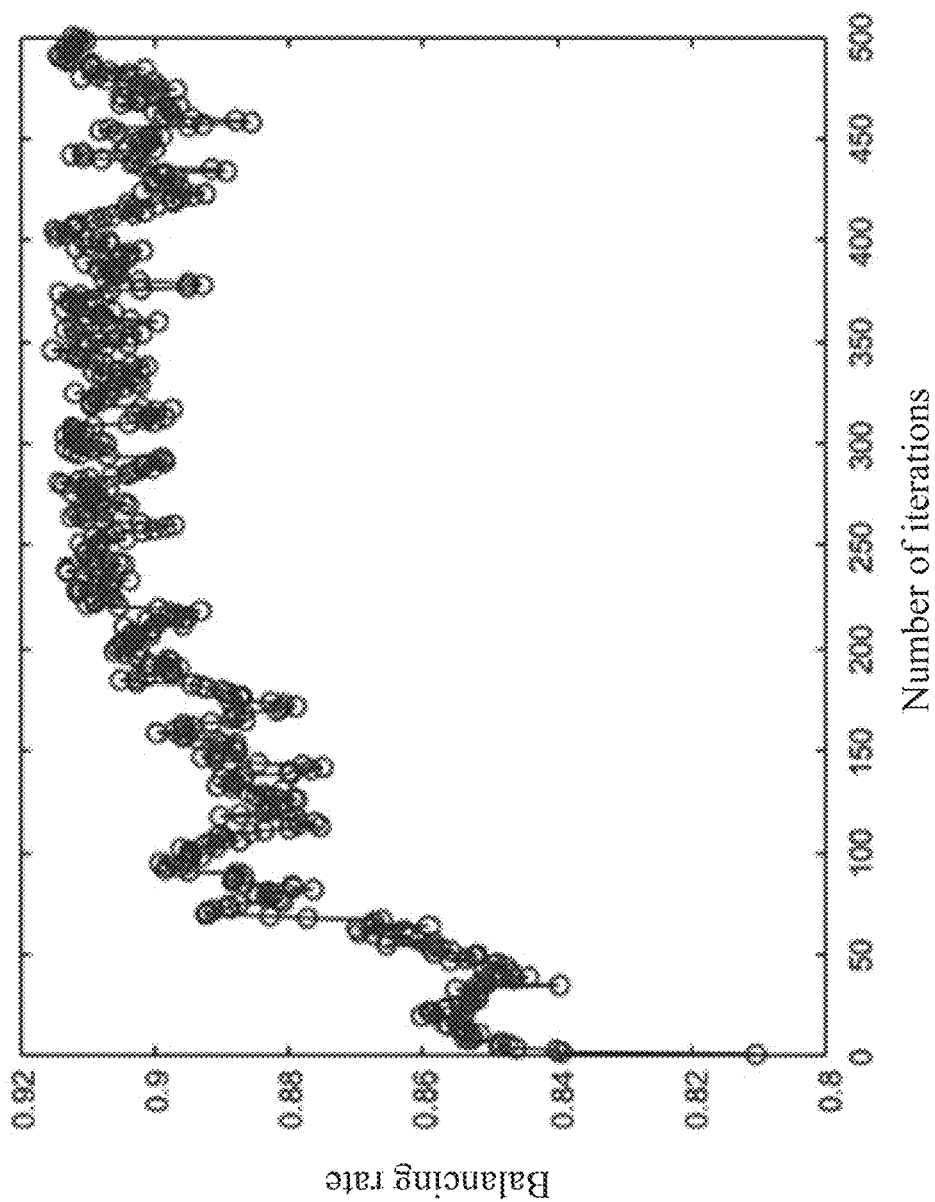
FIG. 4 is a trend diagram of an assembly balancing rate of a type-B computer according to an embodiment of the present invention.
Figure 5:
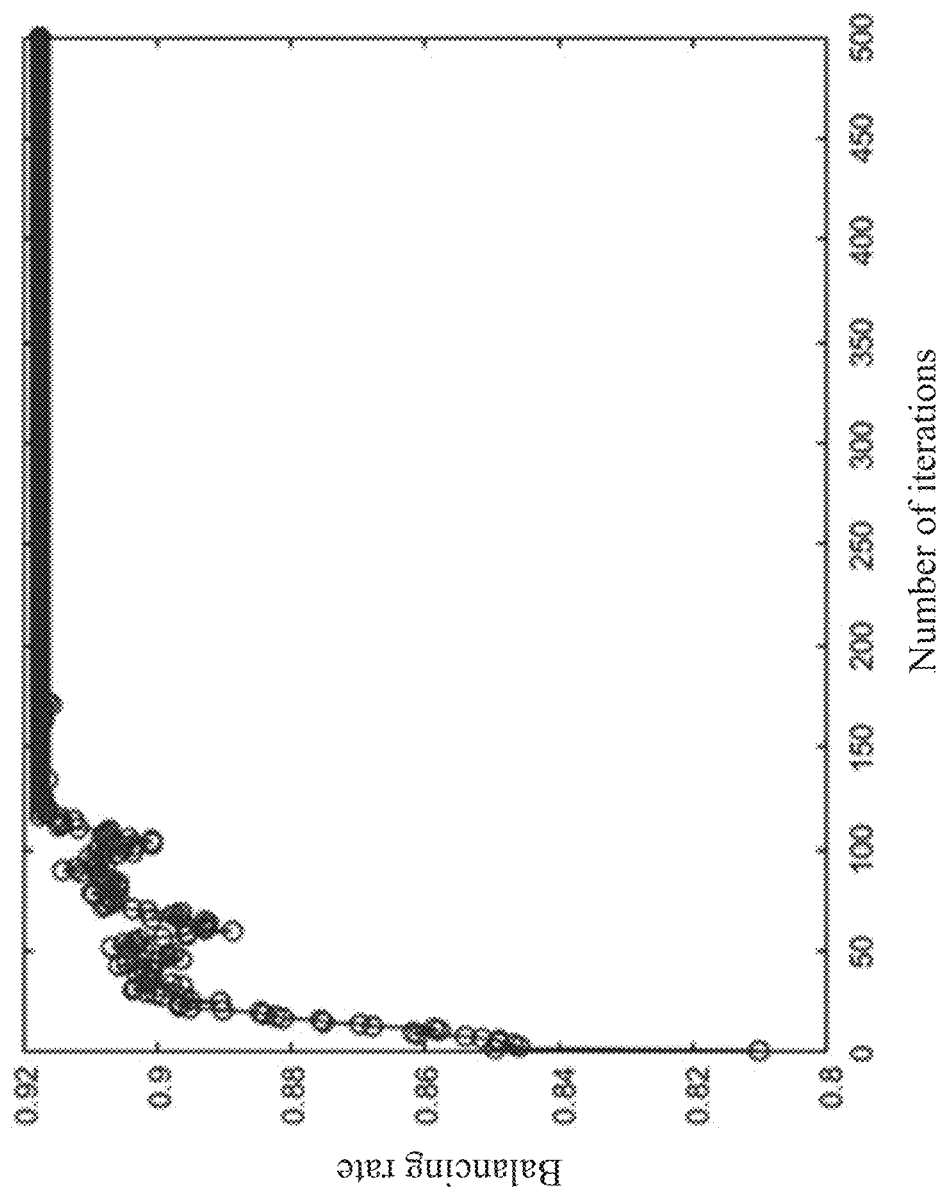
FIG. 5 is a trend diagram of an assembly balancing rate of the type-B computer after a migration feasible solution according to an embodiment of the present invention.
Figure 6:
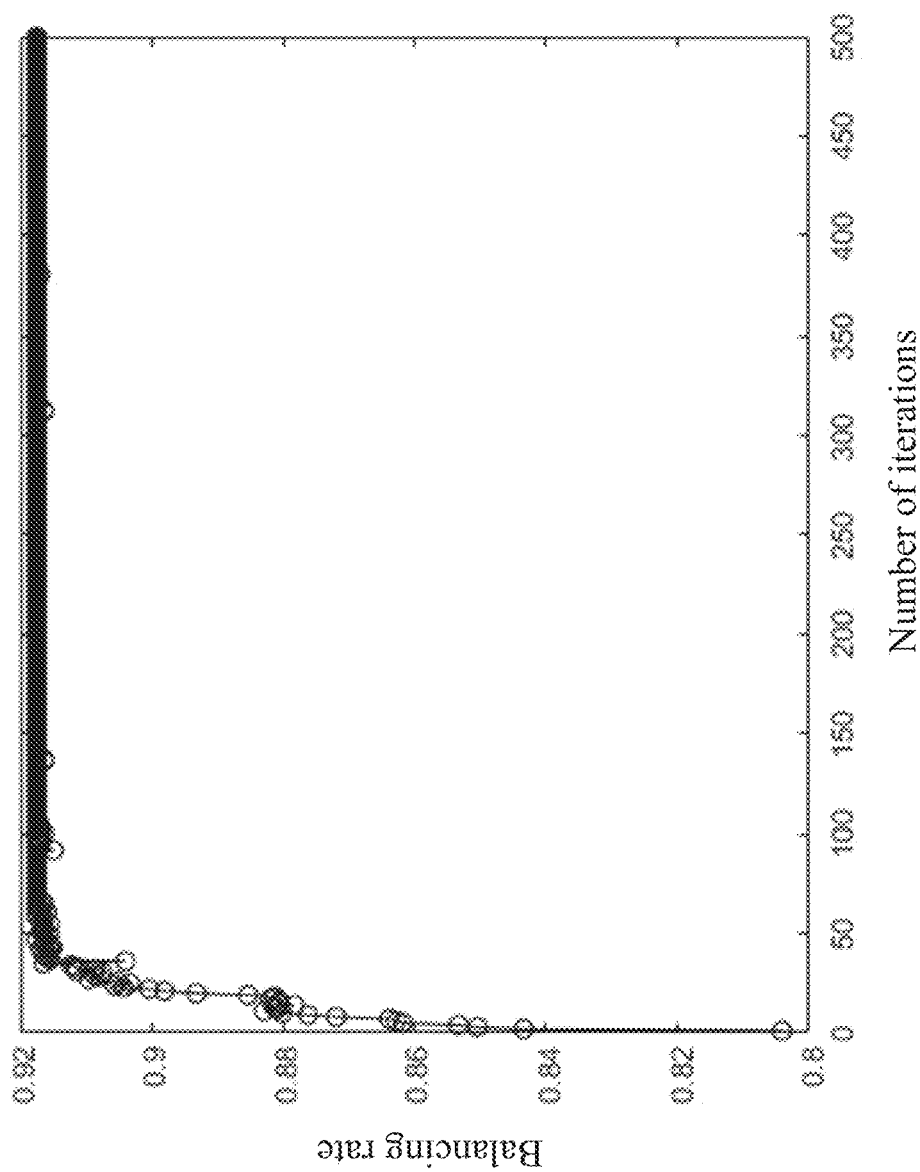
FIG. 6 is a trend diagram of the assembly balancing rate of the type-B computer after a feasible solution provided by an embodiment of the present invention is optimized.

FIG. 4 is a trend diagram of the balancing rate of an assembly line of a type-B computer, FIG. 5 is a trend diagram of the balancing rate of the assembly line of the type-B computer after a migration feasible solution, and FIG. 6 is a trend diagram of the assembly balancing rate of the type-B computer after a feasible solution is optimized. It can be seen from the three figures that balancing rate curves of FIG. 6 compared with FIG. 5 and FIG. 5 compared to FIG. 4 all show the characteristics of faster convergence and converge to the same maximum balancing rate, and further, it can be seen that in the method of introducing the high-quality feasible solutions and the migration feasible solutions in the process of population reproduction can improve the convergence speed of the balancing rate curves while ensuring that the maximum balancing rate does not decrease, so as to find the optimal feasible solutions for the assembly balancing problem of the computers quickly, and achieve the effects of improving productivity and reducing cost of enterprises.

Although embodiments of the present invention have been shown and described, it will be understood by those skilled in the art that various changes, modifications, and substitutions can be made in these embodiments without departing from the principle and spirit of the present invention and modifications, the scope of the present invention is defined by the appended claims and their equivalents.

What is claimed is:

1. A second type computer assembly line balancing optimization method based on a migration genetic algorithm, comprising the following steps:
Step 1: acquiring data of a production line assembly process of a type-A computer and a type-B computer, and expressing data of operation sequence, standard operation time and operation interval in a matrix form;
Step 2: according to a matrix branch expressing the operation sequence of the assembly process of the type-A computer, constructing a priority relationship matrix Matrix of the assembly process of the type-A computer;
Step 3: according to the priority relationship matrix Matrix of the assembly process of the type-A computer and the operation interval expressed in the matrix form, initializing the population of the genetic algorithm, initializing relevant parameters of the genetic algorithm, wherein each chromosome in an initial population obtained by the initialization corresponds to one feasible solution to an assembly line balancing problem of the type-A computer, and the relevant parameters of the genetic algorithm comprise number of the initial populations, population size, number of exchange genes, crossover probability of the populations, and mutation probability of the populations;
Step 4: reproducing the initial populations, and searching and storing high-quality feasible solutions in the populations in the process of population reproduction, wherein all of the high-quality feasible solutions form an external solution set of the assembly line balancing problem of the type-A computer;
Step 5: splitting or merging assembly operation units of the type-B computer, making corresponding processing to assembly operation units of the type-A computer, to obtain new operation sequence and operation interval of the assembly process of the type-B computer, and after such processing, adjusting the external solution set of the assembly line balancing problem of the type-A computer, so that the adjusted external solution set meets the technological requirements of the assembly line of the type-B computer, including the operation sequence and the operation interval of the assembly line of the type-B computer;
Step 6: calculating a similarity of the assembly process of the type-A computer and the type-B computer by comprehensively considering three factors of the standard operation time, the operation sequence and the operation interval;
Step 7: calculating a value of a fitness function of each chromosome in the external solution set obtained in the Step 5, selecting W chromosomes with the largest values of the fitness function from the external solution set, and forming a high-quality feasible solution set to an assembly line balancing problem of the type-B computer, wherein W is determined according to the similarity of the assembly process of the type-A computer and the type-B computer calculated in the Step 6;
Step 8: initializing U chromosomes according to the new operation sequence and operation interval of the assembly process of the type-B computer, and combining the high-quality feasible solution set of the assembly line balancing problem of the type-B computer with the U chromosomes to form an initial population of the assembly line balancing problem of the type-B computer, wherein each chromosome in the initial population corresponds to one feasible solution of the assembly line balancing problem of the type-B computer; and
Step 9: performing a preset number of reproduction operations on the initial population of the assembly line balancing problem of the type-B computer, and selecting preset Q feasible solutions with the largest values of the fitness function in each population reproduction process to optimize the feasible solution of the assembly line balancing problem of the type-B computer by replacing the Q feasible solutions with the smallest values of the fitness function in the next reproduction population so as to obtain the optimal solution set of the assembly line balancing problem of the type-B computer.

2. The second type computer assembly line balancing optimization method according to claim 1, wherein the data of the production line assembly process in the Step 1 comprises number of assembly line workstations, the operation sequence, serial number of the operation units, the standard operation time, and the operation interval.

3. The second type computer assembly line balancing optimization method according to claim 1, wherein in the Step 1, when the operation sequence is expressed in the matrix form, each operation unit and an immediate predecessor operation thereof are arranged in pairs in a matrix to obtain the matrix branch.

4. The second type computer assembly line balancing optimization method according to claim 1, wherein a method for establishing the priority relationship matrix Matrix of the assembly process of the type-A computer is as follows: if the operation unit i is the immediate predecessor operation of the operation unit j in the matrix branch, setting the i th row and the J th column in the matrix Matrix as 1, or else, setting the values as 0.

5. The second type computer assembly line balancing optimization method according to claim 1, wherein a method for initializing the population of the genetic algorithm according to the priority relationship matrix Matrix of the assembly process of the type-A computer and the operation interval expressed in the matrix form defined in the Step 3, comprises the following steps:
  Step 3-2: initializing the population of the genetic algorithm by using the operation sequence and the operation interval as constraints to ensure that each chromosome corresponds to one feasible solution of the assembly line balancing problem of the type-A computer;
  Step 3-2-1: taking the total number of the operation units in the assembly process of the type-A computer as a length N of the chromosomes, and executing the Step 3-2-2 from chromosome counting t=1;
  Step 3-2-2: finding the operation units of which there is no immediate predecessor operation or of which the immediate predecessor operation is assigned to the corresponding chromosomes, and adding the operation units to an assignable operation unit set S;
  Step 3-2-3: calculating difference between an upper limit high-level of the operation interval corresponding to each operation unit in the assignable operation unit set S and a first gene position n of a currently unassigned operation unit, to obtain a difference set;
  Step 3-2-4: sorting each difference in the difference set in an ascending order, selecting the operation unit i corresponding to the difference at the first position of the order and assigning the operation unit i to a position of the $n_{th}$ gene of the chromosome, deleting the operation unit i from the operation unit set S, at the same time, updating the $i_{th}$ row of elements of the corresponding columns of all immediate successor operations of the operation unit i in the priority relationship matrix as 0, and making n=n+1;
  Step 3-2-5: judging whether n≤N or not, if yes, executing the Step 3-2-2, or else, executing Step 3-2-6;
  Step 3-2-6: making t=t+1, judging whether t≤Z or not, wherein Z is the population size, if yes, making n=1 and executing the Step 3-2-2, or else, executing Step 3-3; and
  Step 3-3: searching a minimum bottleneck time in an assignment order of the operation units in each chromosome, and according to the minimum bottleneck time, assigning all of the operation units assigned in each chromosome to a given m workstations according to the positions of respective chromosome genes, so that the feasible solution of the assembly line balancing problem of the type-A computer, corresponding to each chromosome, is obtained.

6. The second type computer assembly line balancing optimization method according to claim 5, wherein a method for searching the minimum bottleneck time in the assignment order of the operation units in each chromosome comprises the following steps:
  Step 3-3-1: calculating a theoretical minimum bottleneck time CT of the feasible solution corresponding to each chromosome;
  Step 3-3-2: according to the current minimum bottleneck time CT, assigning all of the operation units assigned in each chromosome to the given m workstations according to the position of the respective chromosome gene, performing calculating and obtaining a tact time set $\{TT_i\}$ (i=1, 2, 3 . . . , m) of the m workstations, judging whether max$\{TT_i\}$≤CT is met or not, if yes, determining that the current minimum bottleneck time CT is the actual minimum bottleneck time under the sorting of all of the operation units in the chromosome, or else, executing Step 3-3-3;
  Step 3-3-3: calculating a potential increment $\Delta T_i$ of the tact time of each workstation, wherein $\Delta T_i$ expresses the standard operation time of the first operation unit on the $i+1_{th}$ workstation, thus, $\Delta T_0$=0; and
  Step 3-3-4: making CT=max$\{TT_i+\Delta T_i\}$, C=max$\{TT_i\}$, judging whether C≤CT is met or not, if yes, determining that the current minimum bottleneck time CT is the actual minimum bottleneck time under the sorting of all the operation units in the chromosome, or else, executing the Step 3-3-2.

7. The second type computer assembly line balancing optimization method according to claim 1, wherein the Step 4 further comprises the following steps:
  Step 4-1: setting a reproduction generation count M and saving count r=0, and calculating a balancing rate percent of the initial population, wherein the balancing rate of the population is a mean value of the values of the fitness function of all of the chromosomes in the population, and the fitness function adopts an existing assembly line balancing rate solving equation;
  Step 4-2: performing reproduction operation on a current population, optimizing each feasible solution of the assembly line balancing problem of the type-A computer, and calculating a balancing rate percent1 of the population obtained by current L-generation reproduction operation;
  Step 4-3: judging whether percent1−percent is bigger than or equal to a preset balancing rate increase threshold or not, if yes, taking out k chromosomes with the values of the fitness function greater than the preset threshold from the current L-generation population, performing saving, and recording the current saving count as r=r+1;
  Step 4-4: judging whether the ratio of L to a preset interval generation count threshold is an integer or not, if yes, taking out h chromosomes with the values of the fitness function greater than the preset threshold in the current L-generation population and performing saving; and
  Step 4-5: judging whether L≤M, if yes, executing the Step 4-2, or else, executing the Step 5.

8. The second type computer assembly line balancing optimization method according to claim 1, wherein the Step 5 further comprises the following steps:
  Step 5-1: performing processing on the assembly operation unit of the type-B computer corresponding to the assembly operation unit of the type-A computer, specifically comprising splitting or merging the assembly operation units of the type-B computer by referring to the corresponding assembly operation units of the type-A computer, wherein the split or merged assembly operation units and the assembly operation units corresponding to the assembly of the type-A computer shall meet the requirements that the operation units are similar and the standard operation time is close, otherwise the assembly operation units of the type-B computer shall not be split or merged, and the serial numbers of the split or merged assembly operation units of the type-B computer are changed into the serial numbers of the assembly operation units of the type-A computer;

Step 5-2: sorting the assembly operation units of the type-A computer and the assembly operation units of the type-B computer, which are not subjected to corresponding processing, in an ascending order of the standard operation time respectively, then corresponding the sorted assembly operation units of the type-A computer and the type-B computer in an one-to-one manner, deleting redundant operation units of the assembly operation units of the type-A computer after correspondence, relative to the assembly operation units of the type-B computer, wherein the expression form of deleting the redundant operation units of the type-A computer in the external solution set is to delete genes with the same serial number as the redundant operation units in the external solution set, and after deleting operation is executed, changing the serial numbers of the assembly operation units of the type-B computer into the serial numbers of the assembly operation units of the type-A computer;

Step 5-3: according to the assembly operation sequence and the operation interval of the type-B computer, acquired in the Step 1, and the experience of assemblers, setting the new operation sequence and the operation interval of the assembly process of the type-B computer after changing the serial numbers of the operation units, constructing the priority relationship matrix by the new operation sequence of the assembly process of the type-B computer, and expressing the new operation interval of the assembly process of the type-B computer in the form of upper and lower limits;

Step 5-4: adjusting the external solution set obtained in the Step 5-2 by using the priority relationship matrix and the operation interval of the assembly process of the type-B computer, obtained in the Step 5-3, including: exchanging the corresponding positions of the genes of paired operation units which do not conform to the operation sequence, in each chromosome of the external solution set, and exchanging the positions of the genes which do not meet the constraints of the operation interval in each chromosome and the genes which do not have the constraints of the operation interval in the chromosome or the genes of which the operation interval span is greater than the preset threshold, in the external solution set; and Step 5-5: checking whether the chromosomes in the external solution set adjusted in the Step 5-4 meet the two constraints of the operation sequence and the operation interval of the assembly process of the type-B computer, obtained in the Step 5-3, and deleting the chromosomes which do not meet the constraints to form a new external solution set which fully conforms with the constraints.

9. The second type computer assembly line balancing optimization method according to claim 8, wherein the similarity of the assembly process of the type-A computer and the type-B computer is calculated according to the following equation:

$$Sim = (Fitness - w_1 \lim_1 - w_2 \lim_2) * 100\%$$

wherein, Sim is the similarity of the assembly process of the type-A computer and the type-B computer; Fitness is a mean value of the values of the fitness function of all of the chromosomes in the external solution set obtained in the Step 5-5; $\lim_1 = Z_1/l$, l is a number of the chromosomes randomly selected from the external solution set obtained in the Step 5-2, and $Z_1$ is the number of times that l chromosomes exchange the positions of the paired operation units that do not conform to operation sequence at the positions of genes corresponding to the chromosomes, $\lim_2 = Z_2/l$, $Z_2$ is a number of times that the l chromosomes exchange the positions of the genes which do not meet the constraints of the operation interval in each chromosome and the genes which do not have the constraints of the operation interval in the l chromosomes or the genes of which the operation interval span is greater than the preset threshold, and $w_1$ and $w_2$ are respectively weights of $\lim_1$ and $\lim_2$.

10. The second type computer assembly line balancing optimization method according to claim 1, wherein W is equal to a product of the similarity Sim of the assembly process of the type-A computer and the type-B computer and the initial population size of the preset assembly line balancing problem of the type-B computer.

* * * * *